United States Patent
Cappellini et al.

(10) Patent No.: US 12,194,855 B2
(45) Date of Patent: Jan. 14, 2025

(54) SADDLE-RIDE TYPE VEHICLE WITH HYBRID PROPULSION

(71) Applicant: Piaggio & C. S.p.A., Pontedera (IT)

(72) Inventors: Antonio Cappellini, Pontedera (IT);
Andrea Raffaelli, Pontedera (IT);
Mario Santucci, Pontedera (IT)

(73) Assignee: Piaggio & C. S.p.A., Pontedera (IT)

( * ) Notice: Subject to any disclaimer, the term of this patent is extended or adjusted under 35 U.S.C. 154(b) by 319 days.

(21) Appl. No.: 17/780,653

(22) PCT Filed: Nov. 23, 2020

(86) PCT No.: PCT/IB2020/061037
§ 371 (c)(1),
(2) Date: May 27, 2022

(87) PCT Pub. No.: WO2021/105850
PCT Pub. Date: Jun. 3, 2021

(65) Prior Publication Data
US 2023/0009612 A1 Jan. 12, 2023

(30) Foreign Application Priority Data

Nov. 29, 2019 (IT) .................. 102019000022482

(51) Int. Cl.
*B60K 6/40* (2007.10)
*B60K 6/387* (2007.10)
(Continued)

(52) U.S. Cl.
CPC .............. *B60K 6/485* (2013.01); *B60K 6/387* (2013.01); *B60K 6/40* (2013.01);
(Continued)

(58) Field of Classification Search
CPC .......... B60K 6/485; B60K 6/387; B60K 6/40; B60K 2006/4808; B60K 2006/4825; B60W 2300/36
See application file for complete search history.

(56) References Cited

U.S. PATENT DOCUMENTS 6,083,138 A * 7/2000 Aoyama ............... B60W 10/08
903/945
2011/0073391 A1 3/2011 Hanawa et al.
(Continued)

FOREIGN PATENT DOCUMENTS

CN 201086632 Y 7/2008
DE 19956732 A1 6/2000
(Continued)

OTHER PUBLICATIONS

International Search Authority: European Patent Office International Search report for corresponding International Patent Application No. PCT/IB2020/061037 dated Feb. 17, 2021, 5 pages.
(Continued)

*Primary Examiner* — Jason D Shanske
*Assistant Examiner* — James J Triggs
(74) *Attorney, Agent, or Firm* — Patterson Intellectual Property Law, PC

(57) ABSTRACT

The present invention relates to saddle-ride type vehicle, motorcycle or motorbike, comprising a frame (2), at least a steering wheel (3) rotatably connected to the frame and a single driving wheel (4). The vehicle further comprises a motor assembly (10) and a transmission unit (T) that mechanically connects the motor assembly (10) to the driving wheel. The motor assembly comprises a thermal engine (MT) including a crankshaft (11), an electric machine (E) including a stator (S) and a rotor (R), and a clutch (C) including a driving shaft (C1) and a driven shaft (C2). The motor assembly (10) further comprises a gearbox (G) pro-
(Continued)

vided with an input shaft (111) and an output shaft (112). According to the present invention the crankshaft (11) of the thermal engine (MT), the rotor (R) of the electric machine (E) and the two shafts (C1, C2) of the clutch are coaxial so as to rotate around a common rotation axis (101) which is parallel to a longitudinal direction (Y) of the vehicle and parallel to the rotation axis of the output shaft (112) of said gearbox (G).

12 Claims, 4 Drawing Sheets

(51) Int. Cl.
    *B60K 6/485*     (2007.10)
    *B60K 6/48*     (2007.10)

(52) U.S. Cl.
    CPC ............... *B60K 2006/4808* (2013.01); *B60K 2006/4825* (2013.01); *B60W 2300/36* (2013.01)

(56) References Cited

U.S. PATENT DOCUMENTS

2011/0073401 A1*   3/2011   Hanawa ................ B60K 6/485
                                                                     903/902
2017/0313174 A1     11/2017   von Koenigsegg

FOREIGN PATENT DOCUMENTS

| | | |
|---|---|---|
| EP | 3221170 A1 | 9/2017 |
| JP | H1181934 A | 3/1999 |
| JP | 2016107735 A | 6/2016 |
| JP | 2017535486 A | 11/2017 |

OTHER PUBLICATIONS

Japanese Office Action for corresponding JP patent application No. 2022531609, Sep. 3, 2024, 4 pages.

* cited by examiner

SADDLE-RIDE TYPE VEHICLE WITH HYBRID PROPULSION

The present invention falls within the field of the production of a saddle-ride type motorcycle having two or three wheels, wherein only one wheel is a driving wheel. In particular, the present invention relates to a saddle-ride type vehicle with hybrid propulsion, i.e., a vehicle comprising a motor assembly having a thermal engine and a reversible electric machine which can be used either as an electric motor, for increasing the torque available at the driving wheel, or as a generator for recharging a battery assembly connected to the same electric machine.

PRIOR ART

In recent years two- or three-wheeled motorcycles with hybrid propulsion have been proposed, wherein an electric machine is added to the ordinary internal combustion engine. The purpose of this kind of propulsors is substantially to exploit the internal combustion engine in high-efficiency conditions and to recovery energy, by means of the electric machine, while decelerating or braking, and possibly to use the electric machine alone as a propulsor. Generally speaking, the hybrid propulsion aims at reducing the pollutant emission which comes along with the operation of internal combustion engines.

Within hybrid propulsion, a first configuration, also called "series hybrid", is known, wherein the thermal engine is used to drive a rotor of a current generator into rotation, which current generator recharges a battery assembly. The latter powers an electric motor, which provides propulsion to the driving wheel of the motorcycle. In this case, therefore, the propulsion is purely electric and the thermal engine is used only for recharging the batteries and can thus operate under optimal conditions.

A configuration called "parallel hybrid" is also known, wherein the driving wheel can be actuated both by the thermal engine and by the electric motor.

An example of a hybrid motorcycle is described in WO 2004/054836, wherein this kind of propulsion is used in an open frame motorcycle (scooter). In particular, this solution provides for a propulsion assembly comprising a thermal engine, an electric motor and an electric generator. A centrifugal clutch is operatively arranged between the thermal engine and the electric motor. The driving shaft of the centrifugal clutch is connected to the crankshaft of the thermal engine by means of a continuously variable transmission (CVT), whereas the driven shaft of the centrifugal clutch is connected to the rotor of the electric motor. Finally, this rotor is connected to the driving wheel by means of a reduction gear.

In the propulsion assembly described in WO 2004/054836, when the electric motor is switched off the propulsion is provided only by the thermal engine. Conversely, when only the electric motor is powered and the thermal engine is switched off, the propulsion is purely electrical. When both the thermal engine and the electric motor operate simultaneously, the propulsion assembly forms a parallel hybrid, wherein in a low revolution range of the thermal engine the propulsion of the driving wheel relies only on the electric motor, whereas the thermal engine is used to recharge the battery, through the generator.

The technical solution described above thus provides for a transmission (through the CVT) of the motion from the driving shaft to a different shaft, on which the clutch and the rotor of the electric machine are mounted. In particular, the clutch and the electric motor are arranged in a position substantially close to the driving wheel.

Another example of hybrid propulsion, in this case applied to a closed frame motorcycle, is described in US 2013/00818985. According to this solution, the electric motor is mounted along an axis lying at a height, relative to the ground, lower than the height of the shaft of the thermal engine. In this case, the propulsion assembly also comprises a gearbox having an input shaft which rotates around an axis parallel to and spaced apart from the rotation axis of the thermal engine and the rotation axis of the rotor of the electric motor. The gearbox further comprises an output shaft connected to the driving wheel by means of a transmission unit. The motor assembly further comprises a first clutch whose driving shaft is connected, by means of a mechanical transmission, to the shaft of the thermal engine, whereas the driven shaft of the clutch is integral with the input shaft of the gearbox. A second clutch further comprises a driving shaft connected, by means of a second transmission, to the rotor of the electric motor, whereas the driving shaft is connected to the input shaft of the gearbox. By means of the two clutches the thermal engine and the electric motor can be connected to or disconnected from the input shaft of the gearbox. When both of them are connected, the propulsion assembly operates according to the parallel hybrid scheme. When the first clutch is connected and the second clutch is disconnected, the driving torque is generated only by the thermal engine. Conversely, when the first clutch is disconnected and the second clutch is connected, the driving torque is generated only by the electric motor. By disconnecting the first clutch and simultaneously switching on the generator an operation according to the series hybrid scheme is instead established.

The Applicant has noticed that the technical solutions mentioned above, as well as other conceptually similar solutions, have some drawbacks caused in particular by the mutual arrangement of the thermal engine and the electric motor making up the hybrid propulsion. In particular, the configuration of the current propulsion assemblies is particularly complex and bulky, and makes their manufacture and installation difficult. These aspects clearly affect the final manufacturing costs. At the same time, the current configuration of the propulsion assemblies appears to be less advantageous also in connection with possible inspection and/or servicing operations to be carried out on the vehicle.

SUMMARY

The main task of the present invention is thus to provide a hybrid propulsion vehicle which is an effective alternative to known vehicles. Within this task, a first object is to provide a hybrid propulsion motorcycle whose motor assembly is particularly compact and easily mountable onto a frame. Another object of the present invention is to provide a hybrid propulsion motorcycle which is reliable and can be easily manufactured at competitive costs.

The Applicant has observed that the above-mentioned tasks and objects can be achieved by arranging the thermal engine so that its crankshaft rotates coaxially with the rotor of a reversible electric machine and coaxially with the (driving and driven) shafts of the clutch. In particular, the present invention relates to a saddle-ride type vehicle comprising a frame, at least a steering wheel rotatably connected to the frame, a single driving wheel, a motor assembly and a transmission unit that mechanically connects the motor assembly to the driving wheel. The motor assembly comprises:

a thermal engine including a crankshaft;
an electric machine comprising a stator and a rotor;
a clutch comprising a driving shaft and a driven shaft, and
a gearbox provided with an input shaft and an output shaft.

According to the present invention, said crankshaft, said rotor, said driving shaft, and said driven shaft are coaxial so as to rotate around a common rotation axis. Furthermore, said common rotation axis is parallel to the rotation axis of said output shaft of the gearbox and substantially parallel to a longitudinal direction of the vehicle frame.

According to a first embodiment, the crankshaft of said thermal engine is integral with the rotor of the electric machine and with the driving shaft of said clutch. Furthermore, the input shaft of said gearbox is connected to the driven element of the clutch and the output shaft is connected to the driving wheel through the transmission unit.

According to an embodiment, the electric machine is arranged between the thermal engine and the clutch so that the rotor is connected, on a first side thereof, to the crankshaft and, on a second side thereof, to the driving shaft of the clutch.

According to another embodiment, alternative to the last-mentioned embodiment, the thermal engine is arranged between the electric machine and the clutch so that the crankshaft is connected, on a first side thereof, to the rotor of the electric machine and, on a second side thereof, to the driving shaft of the clutch.

According to a further embodiment, the clutch is arranged between the thermal engine and the electric machine, the driving shaft of the clutch is integral with the crankshaft of the thermal engine and the driving shaft of the clutch is integral with the rotor of the electric machine. In a possible modification, the input shaft of said gearbox is connected to the rotor of the electric machine, whereas the output shaft is connected to the driving wheel through the transmission unit.

In another embodiment:
the driving shaft of the clutch is integral with the crankshaft of the thermal engine and the driven shaft of the clutch is integral with the input shaft of the gearbox;
the output shaft of the gearbox is connected to the rotor of the electric machine, and
the rotor of the electric machine is connected to the driving wheel through the transmission unit.

In a possible embodiment thereof, the transmission unit comprises a transmission shaft connected to the output shaft of the gearbox and a transmission module which transmits the motion of the transmission shaft to the driving wheel.

LIST OF THE FIGURES

Further features and advantages of the invention shall become more apparent from the following detailed description of some preferred, although not exclusive, embodiments of the vehicle, provided for indicating and non-limiting purposes, with the aid of the attached drawings, wherein.

In the figures the same reference numerals and characters denote the same elements or components.

DETAILED DESCRIPTION

With reference to the above-listed figures, the present invention thus relates to a saddle-ride type vehicle having a hybrid propulsion. For the purposes of the present invention, the term "saddle-ride type vehicle" shall designate any motorcycle or motorbike having two or three wheels.

Figure 1:
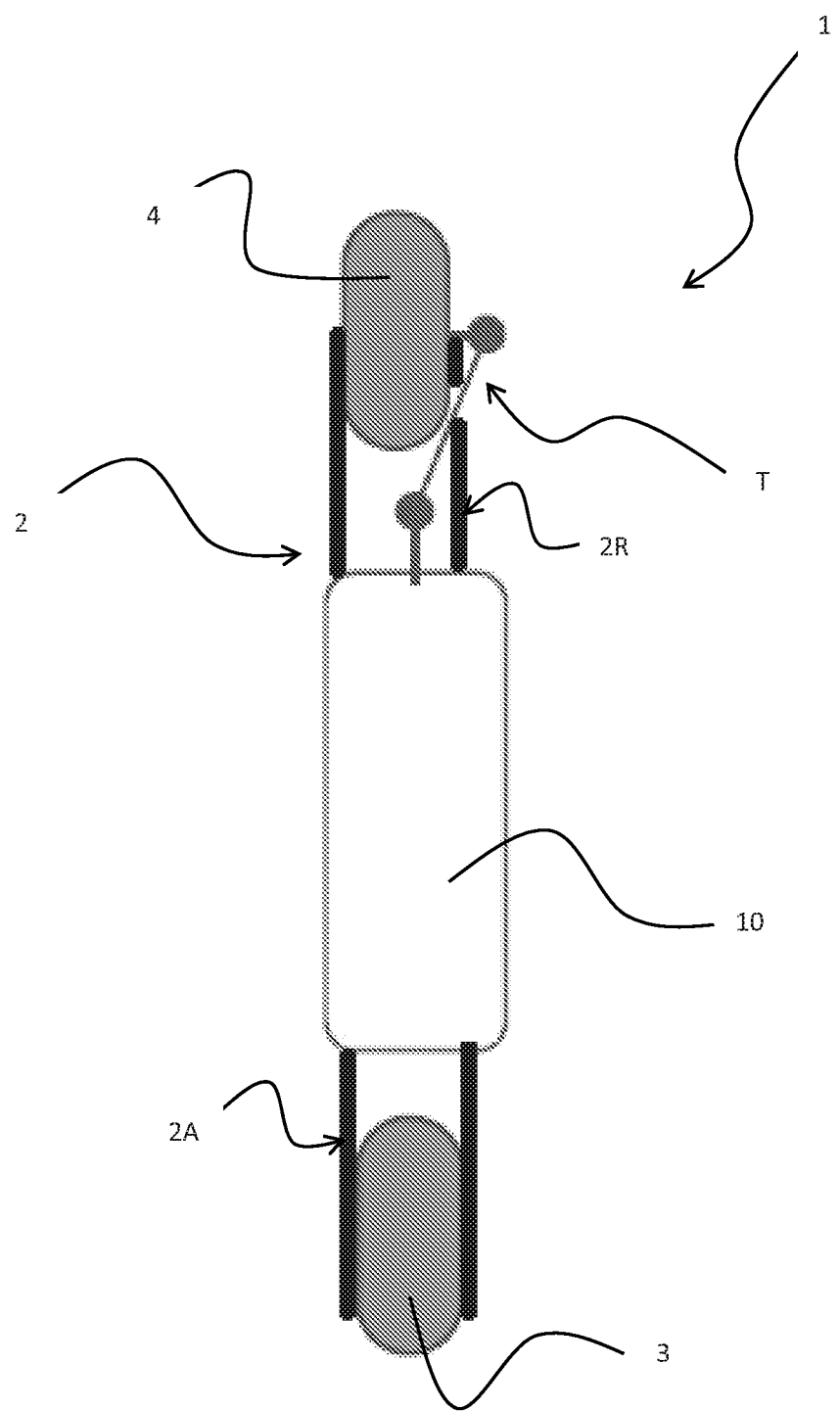
FIG. 1 is an overall diagrammatic view of a vehicle according to the present invention.

FIG. 1 is a diagrammatic view of a vehicle 1 according to the present invention, which, in any case, comprises a frame 2 provided with a fore-carriage portion 2A which supports one or two steering wheels 3. The frame 2 further comprises a rear-carriage portion 2R which supports exclusively a driving wheel. By the term "driving" it is thus meant the single wheel of the vehicle 1 to which the rotation torque generated by the motor assembly 10 is transferred.

The frame 2 of the vehicle 1 supports a motor assembly 10 mechanically connected to the driving wheel 4 through a transmission unit T. The transmission unit T can have different configurations and generally consists of a series of motion transmission members which overall transmit the torque generated by the motor assembly 10 to the driving wheel 4, so as to cause the latter to rotate and ultimately the vehicle to move forward. The vehicle 1 mainly extends along a longitudinal direction Y (or longitudinal axis Y), substantially coinciding with the longitudinal direction of the vehicle itself, i.e., the rear-front direction of the vehicle. In practice, the longitudinal direction is the rear-front direction substantially perpendicular to the rotation axis of the driving wheel 4.

FIGS. 2 to 5 are diagrammatic views of possible embodiments of a motor assembly 10 of a vehicle 1 according to the present invention. In any case, the motor assembly 10 comprises a thermal engine MT and a reversible electric machine E, i.e., an electric machine which can be operated either as an electric motor or as a current generator.

The thermal engine MT comprises a crankshaft 11 which, based on a principle widely known to a person skilled in the art, is made to rotate by the conversion, carried out by means of a slider-crank mechanism, of the translational motion of one or more pistons within cylinders, caused by a combustion process taking place in the same cylinders.

The operation of a reversible electric machine E operatively connected to a battery assembly B is also known to a person skilled in the art. In a first operating mode, the electric machine E operates as a "motor", converting input electric energy, provided at the terminals of a stator S, into mechanical power available at a rotor R. In a second operating mode, the electric machine E operates as an "alternator/generator", converting the rotational mechanical energy of the rotor R into electric energy, which is preferably stored in the battery assembly B.

In the vehicle 1 according to the invention, the motor assembly 10 further comprises a clutch C serving, as known to a person skilled in the art, to connect two shafts upon command, so as to allow, or possibly modulate, the transmission of rotary motion form one shaft to the other. In any case, for the purposes of the present invention, the clutch C comprises a driving shaft C1 having at least one first connecting element C11 integrally connected thereto, and a driven shaft C2 having at least one second connecting element C12 integrally connected thereto. The clutch C comprises actuating means (not shown in the figures) for causing the connecting elements C11, C12 to come into contact with each other, so as to transfer motion from the driving shaft C1 to the driven shaft C2. Still within the framework of the present invention, the clutch C could be of the "dry" type or of the "oil bath" type, or else a centrifugal clutch. A torque converter typically used in automatic gearboxes and, more generally, any other system adapted to carry out a "clutch" function known to the person skilled in the art, as mentioned above, falls within the definition of clutch too.

According to the present invention, in the vehicle 1 the motor assembly 10 is configured so that the crankshaft 11 of the thermal engine MT, the rotor R of the electric machine E and the two shafts (i.e., the driving shaft C1 and the driven shaft C2) of the clutch C all rotate around a common rotation axis 101. In other words, the rotating elements (11, R, C1, C2) of the motor assembly 10 are in-line, so as to form a train of components (M, E, C) extending along a common axis.

Figure 2:
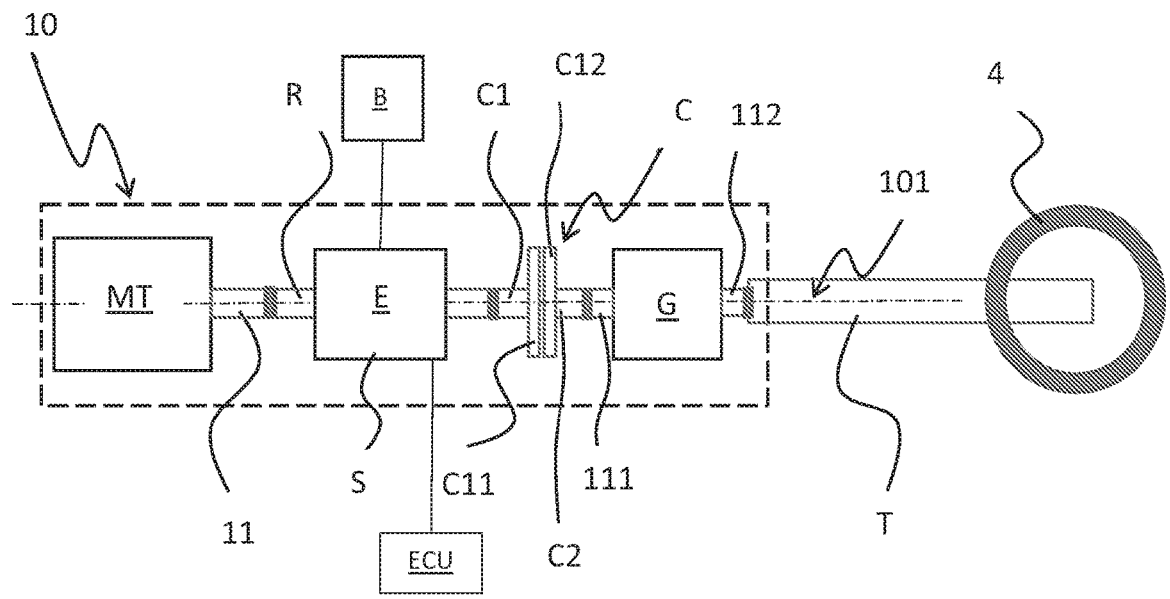
FIGS. 2 to 5 are diagrammatic views each relating to a possible embodiment of a motor assembly of a saddle-ride type vehicle according to the present invention.

According to a first embodiment of the motor assembly 10, schematically shown in FIG. 2, the crankshaft 11 of the thermal engine MT is integral with the rotor R of the electric machine E and with the driving shaft C1 of the clutch C. Therefore, the crankshaft 11, the rotor R and the driving shaft C1 rotate at a same speed around the common rotation axis 101.

In this embodiment, the motor assembly 10 further comprises a gearbox G interposed between the clutch C and the transmission unit T. According to a widely known principle, the gearbox G comprises an input shaft 111 and output shaft 112 a plurality of gears (not shown in the figures), which can be actuated by a lever or by means of an electronic system and are operatively interposed between the two shafts 111, 112 so as to change the speed of the output shaft 112 relative to the speed of the input shaft 111. In the present embodiment (FIG. 2), the input shaft 111 is connected to the driven shaft C2 of the clutch C, whereas the output shaft 112 is connected to the transmission unit T.

Figure 3:
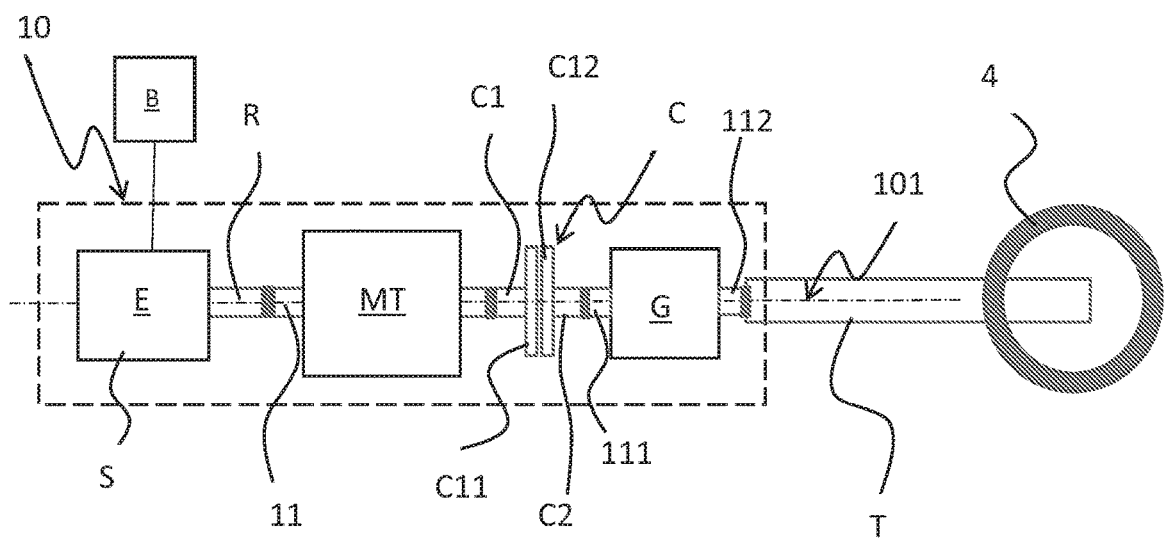
Figure 4:
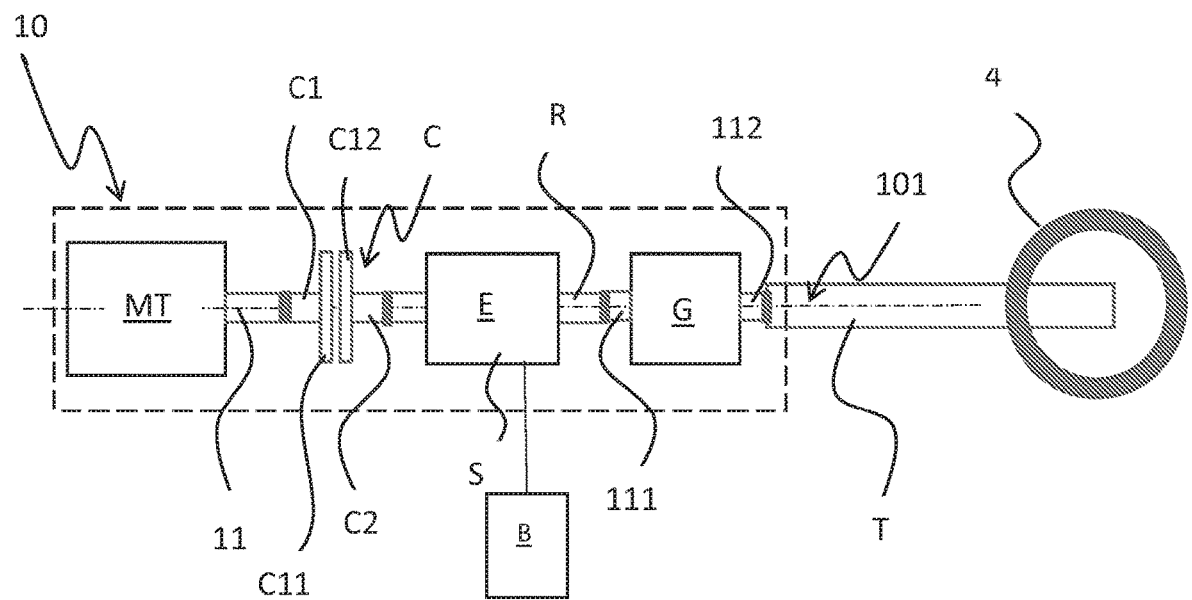

In the diagrammatic view of FIG. 2, as well as in the diagrammatic views of FIGS. 3 and 4, the output shaft 112 of the gearbox G is coaxial with the input shaft 111. However, based on the configuration of the gearbox G, the two shafts 111, 112 could also have a non-coaxial arrangement.

In a second embodiment of the motor assembly 10, shown in the diagram of FIG. 3, the crankshaft 11, the rotor R and the driving shaft C1 are still integral with one another, however the position of the thermal engine MT and the position of the electric machine E are reversed as compared to the diagram of FIG. 2. In particular, the thermal engine MT is operatively arranged, along said common rotation axis 101, between the electric machine E and the clutch C. The crankshaft 11 is thus connected, on a first side thereof, with the rotor R and, on a second side thereof, with the driving shaft C1 of the clutch C.

In both of the described configurations (FIG. 2 and FIG. 3), the electric machine E can be used as a "motor" for starting the thermal engine MT because the rotor R is integral with the crankshaft 11. Preferably, the thermal engine MT is provided with a decompression device for making the cylinders to communicate with the outer environment during the compression and expansion stages, so as to reduce the mechanical torque which has to be provided by the electric machine for starting.

Still referring to FIGS. 2 and 3, during the acceleration phase of the vehicle 1 the electric machine 10 can advantageously be used for increasing the torque generated by the thermal engine MT. In this case, the windings of the stator S are powered by the battery assembly B. Alternatively, during the acceleration phase the torque can be provided to the driving wheel 4 by the thermal engine MT alone. In this case, the windings of the stator S of the electric machine E are not electrically powered and the rotor R is driven into rotation only by the crankshaft 11 of the thermal engine 1, being "idle" relative to the stator S.

Still referring to the diagrammatic views of FIGS. 2 and 3, during a constant-speed running phase the electric machine E can operate as a "generator" for recharging the battery assembly B. Alternatively, in a running condition it is possible not to power the windings of the stator S of the electric machine E, so that the rotor R rotates relative to the stator S without producing any electrical effect.

Finally, also in a braking phase of the vehicle the electric machine E can remain switched off or, alternatively, can operate as a generator for recharging the battery assembly B. In general, the electric machine E can thus be switched on or off in the different running phases of the vehicle (acceleration, constant speed, braking), based on the settings of the control unit ECU of the machine itself. In this regard, for the sake of simplicity, the control unit ECU is shown only in FIG. 2, but it is understood that such unit (ECU) can be present in any of the embodiments herein shown and described, for allowing the electric machine to operate as an electric motor, as a generator/alternator, or, alternatively, to remain switched off. The embodiment diagrammatically shown in FIG. 2 allows the thermal engine MT to be better cooled, because the motor assembly 10 is mounted in such a way that the rotation axis 101 is substantially parallel to the longitudinal axis of the vehicle 1 (see the diagrammatic view of FIG. 6). In this case, a radiator can be easily mounted frontally relative to the thermal engine MT for cooling the same.

As compared with the embodiment of FIG. 2, the arrangement of FIG. 3 allows instead simpler electric connections, also taking into account a possible positioning of the battery assembly B.

According to a possible configuration valid for both of the embodiments shown in FIGS. 2 and 3, the thermal engine MT and the electric machine E can be arranged inside a common carter, in which also the clutch C could optionally be arranged, so as to form a single assembly which can be more easily mounted onto the frame 2 of the vehicle 1.

According to another embodiment of the motor assembly 10, shown in FIG. 4, the clutch C is operatively arranged, along said common rotation axis 101, between the thermal engine MT and the electric machine E. In particular, the driving shaft C1 of the clutch C is integral with the crankshaft 11 of the thermal engine MT, whereas the driven shaft C2 is integral with the rotor of the electric machine E. In this embodiment too, the motor assembly 10 comprises a gearbox G whose input shaft 111 is integral with the rotor R and whose output shaft 112 is instead connected to the transmission unit T.

When the clutch C is activated, i.e., when its connecting elements C1 and C12 are connected, the crankshaft 11 of the thermal engine MT is rotatably integral with the rotor R of the electric machine E. The torque generated by the thermal engine MT is thus transferred to the driving wheel 4. Such torque can be provided alone or, alternatively, it can be complemented by switching the electric machine E on in the "motor" operating mode, so as to increase the thrust (boost).

When instead the clutch C is switched off, i.e., when the two connecting elements C11 and C12 are disconnected, the thermal engine MT does not provide driving power any more. The propulsion of the driving wheel 4 can thus be provided only by the electric machine E through the gearbox G and the transmission unit T.

Therefore, in this embodiment the vehicle 1 can have either a purely electric propulsion (clutch C disconnected) or a hybrid propulsion (clutch C closed and electric machine switched on as a motor). In the case of purely electric propulsion, the gears of the gearbox G can be advantageously used for riding up slopes.

Figure 5:
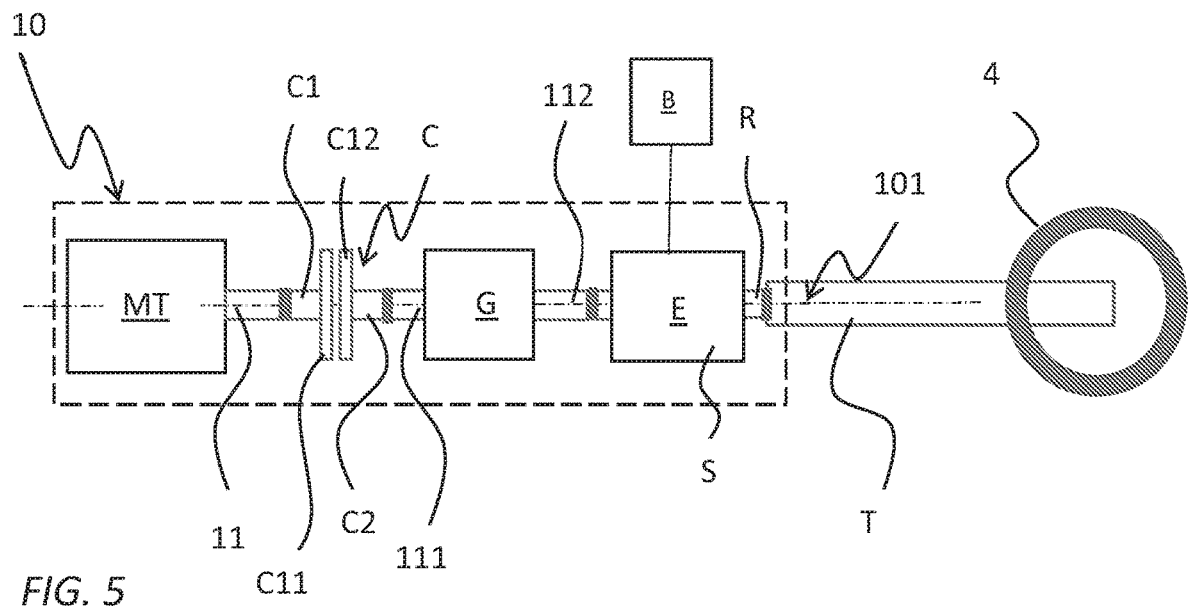

As compared with the diagram of FIG. 4, in the embodiment diagrammatically shown in FIG. 5 the electric machine E is operatively arranged, along said common rotation axis 101, between the transmission unit T and the gearbox G, which in turn is interposed between the clutch C and the electric machine E. In detail, the input shaft 111 of the gearbox G is connected to the driven shaft C2 of the clutch C, whereas the output shaft 112 is connected to one side of the rotor R of the electric machine E. The transmission unit T is instead connected to the other side of the rotor R. In this embodiment, therefore, the gear G is active only when the clutch C is closed, i.e., when the propulsion is provided fully or partially by the thermal engine MT. Therefore, when the propulsion is purely electric, the gears of the gearbox G are not used.

Figure 6:
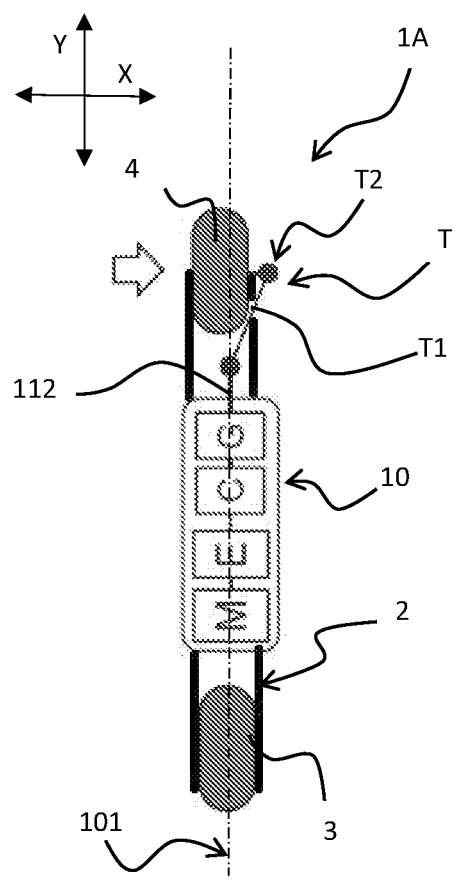
FIG. 6 is a diagrammatic view of an embodiment of a vehicle according to the invention.

Advantageously, the possible embodiments diagrammatically shown in FIGS. 4 and 5 allow the thermal engine MT to be started inertially using the electric machine E as a "motor". This starting requires the connecting elements C11 and c12 of the clutch to be initially disconnected. In this condition the vehicle 1 is made to move by a purely electric propulsion. When the vehicle 1 reaches a predetermined speed, the friction C is closed, i.e., activated, so as to connect the two connecting elements C11, C12 and thus to drive the crankshaft 11 into rotation, thus starting the thermal engine MT. In a possible operating mode, when the clutch C is closed, the electric machine E could be advantageously accelerated, by means of the control unit, for compensating the slowing down of the rotor R due to the increased load thereon. Referring to the embodiments diagrammatically shown in FIGS. 4, 5, during an acceleration phase of the vehicle 1 the electric machine E can thus be switched on in the "motor" mode for increasing the thrust or, alternatively, can remain switched off, thus not contributing to the propulsion, which is provided only by the thermal engine MT. In the embodiment of FIG. 6, the switching on of the electric machine E as a "motor" is instead used for complementing for the acceleration phase, as already mentioned above.

Still referring to the embodiments diagrammatically shown in FIGS. 4 and 5, the battery assembly B can be recharged by switching on the electric machine E in the "generator" mode during a constant-speed running phase or a braking phase of the vehicle. It is in any case possible to leave the electric machine E switched off in one or both of these phases.

In the embodiment shown in FIG. 6, the common rotation axis 101 defined by the motor assembly 10 is oriented so as to be substantially parallel to the longitudinal axis Y. The arrangement shown in FIG. 6 turns out to be particularly advantageous also as far as the stability of the vehicle is concerned, above all with respect to rolling movements. In fact, the plane on which the rotation axis of the thermal engine MT, and thus the axis of the rotor R of the electric machine E, lies does not change during vehicle rolling. In practice, with this configuration possible gyroscopic yawning effects, which could add up to similar effects caused by the wheels, are avoided, or at least greatly reduced.

In FIG. 6, the motor assembly 10 has a configuration corresponding to that diagrammatically shown in FIG. 2. However, the motor assembly 10 could also be configured as shown in FIGS. 3 and 4, i.e., in the embodiments in which the gearbox G has the output shaft 112 connected to the transmission unit T.

In FIG. 6, the transmission unit T comprises a transmission shaft T1 connected (for example, by means of a universal or homokinetic joint) to the output shaft 112 of the gearbox G and to transmission module (for example, a hypoid) T2 which transmits the rotary motion of the shaft T1 to the driving wheel 4.

The technical solutions described above allow the outlined tasks and objects to be fully accomplished. In particular, the arrangement of the components (thermal engine MT, electric machine E and clutch C) along a same axis allows an easy assembly and makes their mounting onto the vehicle frame easier, thus reducing the final manufacturing times and costs.

The invention claimed is:

1. A saddle-ride type vehicle comprising:
   a frame defining a longitudinal direction;
   at least a steering wheel rotatably connected to the frame;
   a single driving wheel;
   a transmission unit that mechanically connects said driving wheel to a motor assembly,
   wherein said motor assembly comprises:
      a thermal engine comprising a crankshaft;
      an electric machine comprising a stator and a rotor;
      a clutch comprising a driving shaft and a driven shaft; and
      a gearbox provided with an input shaft and an output shaft,
   wherein the transmission unit comprises a transmission shaft connected to the output shaft of the gearbox and a transmission module which transmits motion of the transmission shaft to the driving wheel;
   wherein said crankshaft, said rotor, said driving shaft, and said driven shaft are coaxial to rotate around a common rotation axis, and
   wherein said common rotation axis is parallel to a rotation axis of said output shaft of the gearbox and substantially parallel to said longitudinal direction.

2. The vehicle of claim 1, wherein said crankshaft of said thermal engine is integral with said rotor of said electric machine and with said driving shaft of said clutch, wherein said input shaft is connected to said driven shaft of said clutch and wherein said output shaft is connected to said driving wheel through said transmission unit.

3. The vehicle of claim 1, wherein said electric machine is arranged between said thermal engine and said clutch so that said rotor is connected, on a first side thereof, to said crankshaft and, on a second side thereof, to said driving shaft of said clutch.

4. The vehicle of claim 1, wherein said thermal engine is arranged between said electric machine and said clutch so that said crankshaft is connected, on a first side thereof, to said rotor of said electric machine and, on a second side thereof, to said driving shaft of said clutch.

5. The vehicle of claim 1, wherein said clutch is arranged between said thermal engine and said electric machine and wherein said driving shaft of said clutch is integral with said crankshaft of said thermal engine and said driving shaft of said clutch is integral with said rotor of said electric machine.

6. The vehicle of claim 5, wherein said input shaft of said gearbox is connected to said rotor of said electric machine and wherein said output shaft is connected to said driving wheel through said transmission unit.

7. A saddle-ride type vehicle comprising:
a frame defining a longitudinal direction;
at least a steering wheel rotatably connected to the frame;
a single driving wheel;
a transmission unit that mechanically connects the driving wheel to a motor assembly,
wherein the motor assembly comprises:
a thermal engine comprising a crankshaft;
an electric machine comprising a stator and a rotor;
a clutch comprising a driving shaft and a driven shaft; and
a gearbox provided with an input shaft and an output shaft;
wherein:
the driving shaft of the clutch is integral with the crankshaft of the thermal engine and the driven shaft of the clutch is integral with the input shaft of the gearbox;
the output shaft of said gearbox is connected to the rotor of the electric machine;
the rotor of the electric machine is connected to the driving wheel through the transmission unit,
the crankshaft, the rotor, the driving shaft, and the driven shaft are coaxial to rotate around a common rotation axis, and
the common rotation axis is parallel to a rotation axis of the output shaft of the gearbox and substantially parallel to the longitudinal direction.

8. The vehicle of claim 7, wherein:
the crankshaft of the thermal engine is integral with the rotor of the electric machine and with the driving shaft of the clutch;
the input shaft is connected to the driven shaft of the clutch; and
the output shaft is connected to the driving wheel through the transmission unit.

9. The vehicle of claim 7, wherein the electric machine is arranged between the thermal engine and the clutch so that the rotor is connected, on a first side thereof, to the crankshaft and, on a second side thereof, to the driving shaft of the clutch.

10. The vehicle of claim 7, wherein the thermal engine is arranged between the electric machine and the clutch so that the crankshaft is connected, on a first side thereof, to the rotor of the electric machine and, on a second side thereof, to the driving shaft of the clutch.

11. The vehicle of claim 7, wherein:
the clutch is arranged between the thermal engine and the electric machine; and
the driving shaft of the clutch is integral with the crankshaft of the thermal engine and the driving shaft of the clutch is integral with the rotor of the electric machine.

12. The vehicle of claim 11, wherein:
the input shaft of the gearbox is connected to the rotor of the electric machine; and
the output shaft is connected to the driving wheel through the transmission unit.

* * * * *